(12) United States Patent
Köpken et al.

(10) Patent No.: US 8,988,034 B2
(45) Date of Patent: Mar. 24, 2015

(54) DRIVE SYSTEM AND METHOD FOR OPERATING SUCH A DRIVE SYSTEM

(75) Inventors: Hans-Georg Köpken, Erlangen (DE);
Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 126 days.

(21) Appl. No.: 13/551,135

(22) Filed: Jul. 17, 2012

(65) Prior Publication Data

US 2013/0181645 A1    Jul. 18, 2013

(30) Foreign Application Priority Data

Jul. 18, 2011  (EP) ..................... 11174344

(51) Int. Cl.
| | | |
|---|---|---|
| H02P 23/00 | (2006.01) | |
| H02P 3/08 | (2006.01) | |
| B60L 7/14 | (2006.01) | |
| B60L 11/18 | (2006.01) | |
| H02P 3/22 | (2006.01) | |
| B60L 3/00 | (2006.01) | |

(52) U.S. Cl.
CPC ... *H02P 3/08* (2013.01); *B60L 7/14* (2013.01); *B60L 11/1803* (2013.01); *H02P 3/22* (2013.01); *B60L 3/0076* (2013.01); *Y02T 10/7005* (2013.01); *Y02T 10/642* (2013.01)
USPC ............................................. 318/798; 363/55

(58) Field of Classification Search
USPC ......................... 318/490, 503, 798, 801–811; 363/55–58
See application file for complete search history.

(56) References Cited

U.S. PATENT DOCUMENTS

| | | | | |
|---|---|---|---|---|
| 3,914,671 | A | * | 10/1975 | Morton et al. ................. 318/139 |
| 4,426,610 | A | * | 1/1984 | Kawada et al. ............... 318/798 |
| 5,412,293 | A | | 5/1995 | Dohkoshi et al. |
| 5,469,351 | A | * | 11/1995 | Masrur et al. ............... 363/56.02 |
| 6,020,696 | A | * | 2/2000 | Matsunaga et al. ........... 318/139 |
| 6,281,660 | B1 | * | 8/2001 | Abe .............................. 320/103 |
| 6,836,085 | B2 | * | 12/2004 | Kawada et al. ............... 318/139 |
| 6,838,839 | B2 | * | 1/2005 | Goto et al. .................... 318/139 |
| 6,909,199 | B2 | * | 6/2005 | Gupta et al. ..................... 290/52 |
| 7,023,107 | B2 | * | 4/2006 | Okuda et al. ................. 307/10.1 |
| 7,816,804 | B2 | * | 10/2010 | Soma et al. .................. 307/10.1 |
| 7,923,951 | B2 | * | 4/2011 | Soma et al. ................... 318/376 |
| 8,330,374 | B2 | * | 12/2012 | Tanaka et al. ................... 315/77 |

(Continued)

FOREIGN PATENT DOCUMENTS

| | | | |
|---|---|---|---|
| EP | 1 524 761 A2 | | 4/2005 |
| JP | 2012034451 A | * | 2/2012 |

*Primary Examiner* — Rina Duda
*Assistant Examiner* — Bickey Dhakal
(74) *Attorney, Agent, or Firm* — Henry M. Feiereisen LLC.

(57) ABSTRACT

A drive system for an electric motor includes a connection for a battery, and an inverter having an input side connected to an intermediate circuit and an output side having a connection for an electric motor. The intermediate circuit includes a first thyristor connected in parallel with an intermediate circuit capacitance. The drive system may also include a rectifier having an input side connected at the output side of the inverter in parallel with the electric motor, and a second thyristor connected an output side of the rectifier. The first/second thyristor are configured to be activated by a monitor incorporated in or assigned to the drive system. In the event of a malfunction, the input and/or output side of the inverter can be electrically isolated to allow a multiply redundant armature short circuit.

10 Claims, 4 Drawing Sheets

(56) References Cited

U.S. PATENT DOCUMENTS

| 8,508,966 | B2* | 8/2013 | Tagome | 363/132 |
| 8,513,830 | B2* | 8/2013 | Kimura et al. | 307/10.1 |
| 2006/0145642 | A1* | 7/2006 | Choi et al. | 318/293 |
| 2009/0167216 | A1 | 7/2009 | Mogari et al. | |
| 2011/0181104 | A1* | 7/2011 | Kamaga | 307/9.1 |
| 2012/0274277 | A1* | 11/2012 | Masuda et al. | 320/109 |

* cited by examiner

DRIVE SYSTEM AND METHOD FOR OPERATING SUCH A DRIVE SYSTEM

CROSS-REFERENCES TO RELATED APPLICATIONS

This application claims the priority of European Patent Application EP11174344, filed Jul. 18, 2011, pursuant to 35 U.S.C. 119(a)-(d), the content of which is incorporated herein by reference in its entirety as if fully set forth herein.

BACKGROUND OF THE INVENTION

The present invention relates to a drive system and a method for operating such a drive system, in particular for an electric vehicle.

The following discussion of related art is provided to assist the reader in understanding the advantages of the invention, and is not to be construed as an admission that this related art is prior art to this invention.

An electric vehicle is driven by way of a battery carried by said vehicle, a drive regulator, an inverter and an electric motor—hereafter referred to simply as a motor. The drive system here contains at least the drive regulator and the inverter. If a battery and motor are connected, these are also part of the drive system. The motor here is in particular a permanently excited synchronous motor. Such motors have a high level of efficiency and a high power density. A specific speed to torque characteristic means that such a motor is also operated in the field weakening range. To this end a corresponding current is impressed on the motor. This current generates a magnetic field, which counteracts the field generated by the permanent magnets.

However, the field weakening current can no longer be maintained in the event of a malfunction. Depending on the type of malfunction, impermissible torques, specifically braking torques, and impermissible stresses can then be produced and these then have to be controlled.

In industrial drives a braking torque is not normally a problem in the event of a malfunction, as the best possible fast deceleration is always desirable.

To decelerate an electric motor what is known as armature short circuit braking is known per se. Such deceleration is preferably considered when the motor can no longer be braked electrically (in any other manner), as the short circuit brought about produces a temporarily high current flow. With armature short circuit braking—or in short with an armature short circuit—in the event of a malfunction, the three upper or three lower transistors (IGBTs) of the inverter are activated. The stator windings of the motor are short circuited in the process so that current can flow between them. The rotor is thus brought to a standstill. A braking torque hereby results over the entire speed range, which is still acceptable with typical motor designs.

However the probability that an IGBT module or an activation circuit provided for its activation will fail in such a manner that an armature short circuit is no longer possible is relatively high or at least so high that it is not possible to meet safety requirements in this manner.

In the event of a defect in an IGBT module it is essential to start with all conceivable malfunctions in respect of the transistors and freewheeling diodes contained in the modules.

If for example neither the lower nor the upper transistors can be activated, the problem arises that normally the electromotive force (EMF) of the motor would increase by certain factors in relation to the nominal voltage at high speeds after elimination of the demagnetization current and with the motor connectors open. This is prevented by clamping the stator voltage across the freewheeling diodes to the battery voltage but this produces the exceptional situation of a high recovery current into the battery, generating a high, impermissible braking torque. Once the speed has dropped so low that the rectified EMF is lower than the battery voltage, the braking torque becomes zero.

If on the one hand the transistors can no longer be activated for an armature short circuit and on the other hand the freewheeling diodes are no longer conducting, a very high voltage occurs, also as a further exceptional situation, at the motor connectors or at the output of the inverter. This can cause the destruction of the inverter and/or of the motor as well as arcing with fire as a result and can eliminate the safe electrical isolation of inverter and motor.

It would therefore be desirable and advantageous to obviate prior art shortcomings and to provide an improved method and/or an apparatus for operating a drive system, with which the abovementioned errors can be controlled with adequate reliability, and more particularly a method and/or an apparatus suitable for use in or with electric vehicles.

SUMMARY OF THE INVENTION

According to one aspect of the present invention, a drive system for an electric motor includes a connection for a battery, and an inverter having an input side connected to an intermediate circuit and an output side having a connection for an electric motor. The intermediate circuit includes a first thyristor connected in parallel with an intermediate circuit capacitance and configured to be activated by a monitor incorporated in or assigned to the drive system.

According to another aspect of the invention, a drive system for an electric motor includes a connection for a battery, an inverter having an input side connected to an intermediate circuit and an output side having a connection for an electric motor, a rectifier having an input side connected at the output side of the inverter in parallel with the electric motor, and a thyristor connected an output side of the rectifier and configured to be activated by a monitor incorporated in or assigned to the drive system. The rectifier and the second thyristor may be used alone or on conjunction with the first transistor.

According to yet another aspect of the invention, a method for testing the aforedescribed drive system includes the steps of isolating the inverter electrically from the battery, activating the first thyristor, and comparing with the monitor a resulting intermediate circuit current with an expected intermediate circuit current.

According to yet another aspect of the invention, a method for testing the aforedescribed drive system includes the steps of, with the monitor, activating the thyristor, activating the inverter to output successive short voltage pulses, and monitoring during or after each voltage pulse whether the respective voltage pulse produces a current flow.

To make a distinction the thyristor provided in the intermediate circuit is hereafter referred to as the first thyristor and the thyristor provided on the output side of the rectifier is referred to as the second thyristor. Since the drive system can be extended alternatively or cumulatively by the first thyristor on the one hand and the rectifier and the second thyristor on the other hand, the description also relates to a drive system, which does not comprise a first thyristor but only the rectifier and the second thyristor or only comprises the first thyristor and no rectifier and second thyristor.

The advantage of the invention is that with the first thyristor in the intermediate circuit a situation can be controlled in which an undesirable recovery current into the battery results.

The first thyristor can be activated, causing upon its so-called ignition an armature short circuit in the intermediate circuit by way of the conventional freewheeling diodes contained in the inverter.

Alternatively or in addition, overvoltages at the output of the inverter may advantageously be controlled with the rectifier and the second thyristor. Such an overvoltage at the output of the inverter can result if the freewheeling diodes of the inverter no longer conduct or if its transistors can no longer be switched. Connected to terminals provided to connect the motor or—electrically identically or at least essentially identically—to the output terminals of the inverter, in other words parallel to a motor connected to the drive control unit, as inverter, are or will be an in particular six-pulse rectifier and by way of its output side the second thyristor. Upon activation of the second thyristor an armature short circuit is generated across the diodes of the rectifier.

According to an advantageous feature of the present invention, the drive system may include a fuse electrically connected between the battery and the intermediate circuit, with the fuse and the first thyristor being connected in series to the battery as the power source on activation of the first thyristor in respect of a current circuit closed across the first thyristor, a short circuit current flows from the battery by way of the fuse and the first thyristor, triggering the fuse within the shortest time and thus isolating the inverter along with the intermediate circuit electrically from the battery. This electrical isolation also protects the first thyristor from destruction by the short circuit current.

The first or second thyristor, respectively, is triggered by the monitor, if a certain exceptional situation exists, which is to be controlled by activation of the respective thyristor. To activate the first thyristor, the monitor compares continuously or regularly, preferably at intervals of equal length, whether the intermediate circuit voltage U_ZK or a measure of the intermediate circuit voltage exceeds a predetermined or predeterminable threshold value. For this purpose the monitor includes the functionality of a comparator (either in hardware, firmware or software) and means for supplying the measure of the intermediate circuit voltage U_ZK and of the threshold value to the comparator as well as means for forwarding and outputting a signal depending on the result of the comparison performed by the comparator.

Additionally or alternatively, the monitor uses the measured currents and voltages to calculate the torque and compares this with the setpoint value. If the deviation exceeds a lower or upper threshold, ignition of the thyristor is similarly performed. A corresponding method is provided for activation of the second thyristor and here the monitor compares—as described above—whether the measure of an output voltage of the inverter exceeds a predetermined or predeterminable threshold value.

According to an advantageous feature of the present invention, when in addition to activating the first thyristor or in addition to activating the second thyristor, in particular after the passage of a predetermined or predeterminable waiting period, the monitor activates either the three lower transistors of the inverter or the three upper transistors of the inverter or the lower and upper transistors together, an armature short circuit brought about in this manner causes the previously ignited thyristor to be extinguished again. Depending on the forward characteristic of the thyristors and the transistors it may be necessary to ensure, for example by means of a diode connected in series to the thyristor, that the current in the thyristors drops below the holding current, when the transistors are activated.

According to an advantageous feature of the present invention, a possible criterion for subsequent termination of the activation of the transistors of the inverter is that the monitor monitors when a measure of a speed of the electric motor drops below a predetermined or predeterminable threshold value. The monitor may use software, firmware or hardware comparator provided for the purpose to generate an electrical signal to terminate activation of the transistors of the inverter, thereby also in turn terminating the armature short circuit.

The abovementioned object is also attained with a control facility, referred to here and in the following as a monitor, for monitoring the drive system and for activating power components contained therein, specifically transistors and/or thyristors, which operates according to a method as described here and in the following and comprises means for performing the method for this purpose. As far as this aspect is concerned, the invention is preferably implemented in the form of software or firmware or a combination of software and firmware. The method according to the invention may be implemented with a computer program having program code instructions that can be executed by a computer, specifically for example a processing unit of the monitor in the manner of a microprocessor or ASIC, and with a storage medium containing such a computer program and finally also a control facility or a drive system having a memory into which such a computer program is or can be loaded as a means for performing the method and its embodiments.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
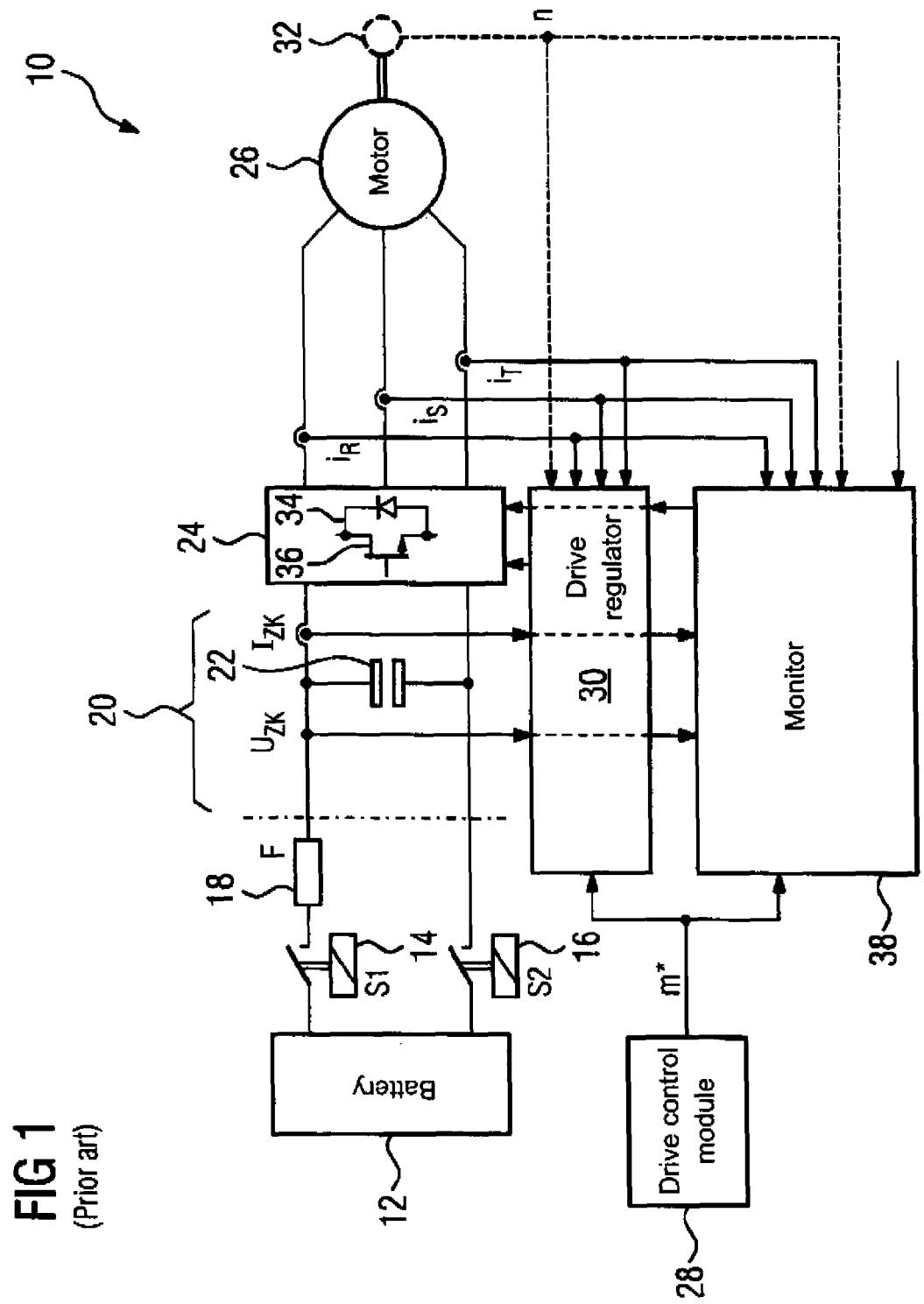
FIG. 1 shows a drive system according to the prior art.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic diagram a drive system 10 for an electric vehicle (not shown). The drive system 10 includes a battery 12, in particular a high-voltage battery, which is connected by way of a first and second switch 14, 16 and a fuse 18 to an intermediate circuit 20 with an intermediate circuit capacitance 22. Following the intermediate circuit 20 here and in the following is an inverter 24, also referred to as an IGBT module, and connected to this in a three-phase manner is a motor (electric motor) 26.

Provided for drive control purposes is a drive control module 28, which generates a setpoint torque value (m*) and forwards it at least to a drive regulator 30 as the setpoint value for a regulation implemented there. The setpoint torque value can be formed or derived indirectly or directly by the drive control module 28, for example based on a position of a pedal (gas pedal).

The drive regulator 30 evaluates measurement values for the regulation process, specifically measurement values for an intermediate circuit voltage U_ZK, an intermediate circuit current I_ZK and the phase currents i_R, i_S, i_T to the motor 26. It is optionally also possible to detect an instantaneous speed n of the motor 26 by way of an encoder 32, so that in some instances this is also available as a further measurement value. The drive regulator uses the predetermined setpoint torque value m* and the instantaneous values of individual or all measurement values to control the inverter 24, specifically one or more transistors 36 contained therein and each connected in a parallel manner to a freewheeling diode 34.

An in particular safety-oriented torque monitor 38 is used for the known protection measures proposed in the introduction to the description, also being referred to in the following in some instances in a shorter manner simply as a monitor 38. Activation of the inverter 24, specifically of the three lower and/or upper transistors 36, can bring about the armature short circuit described in the introduction to the description for example.

Figure 2:
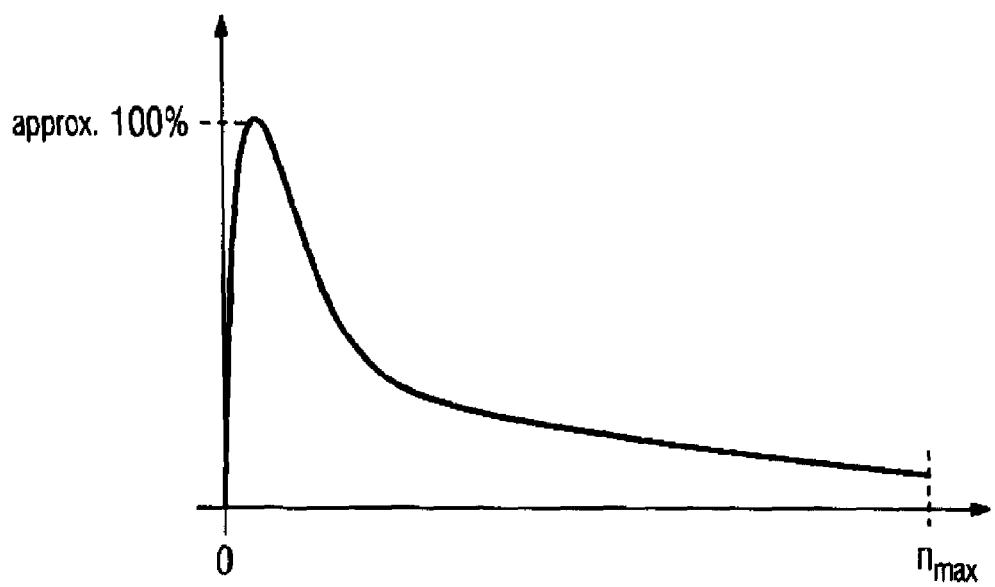
FIGS. 2 and 3 show diagrams of a torque pattern in certain error/exceptional situations.
Figure 3:
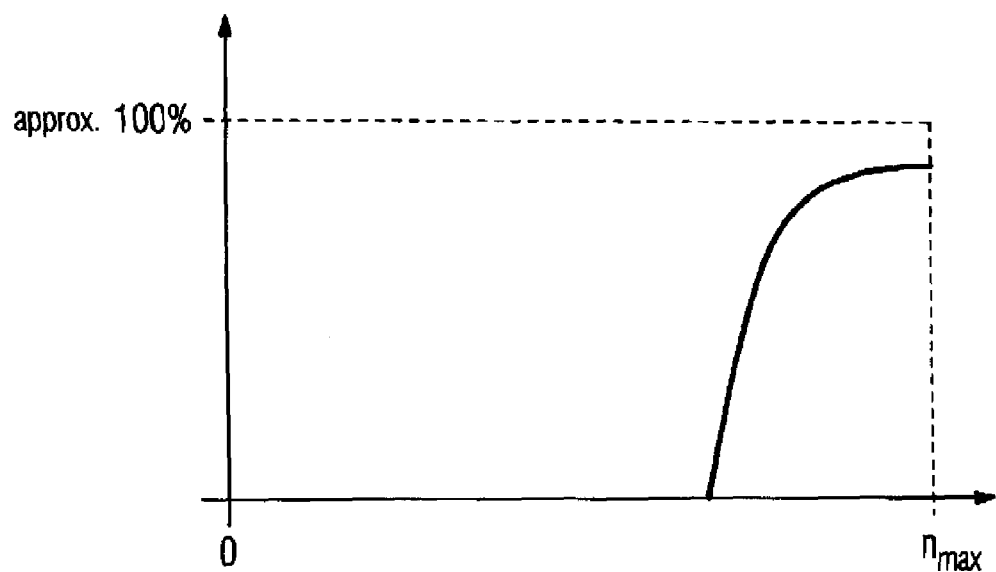

To this end FIG. 2 shows the torque/braking torque resulting with an armature short circuit plotted over speed. It can be seen that a braking torque results from a maximum speed n_max over the entire speed range and this rises in the direction of low speeds and reaches a maximum shortly before the motor 26 comes to a standstill (zero speed). FIG. 3 shows a representation of the braking torque over speed for recovery into the battery 12 as described above. At high speeds, in particular also at maximum speed n_max, a high braking torque is present, disappearing in the direction of lower speeds. The 100% in both diagrams (FIG. 2 and FIG. 3) refers to the maximum torque.

Figure 4:
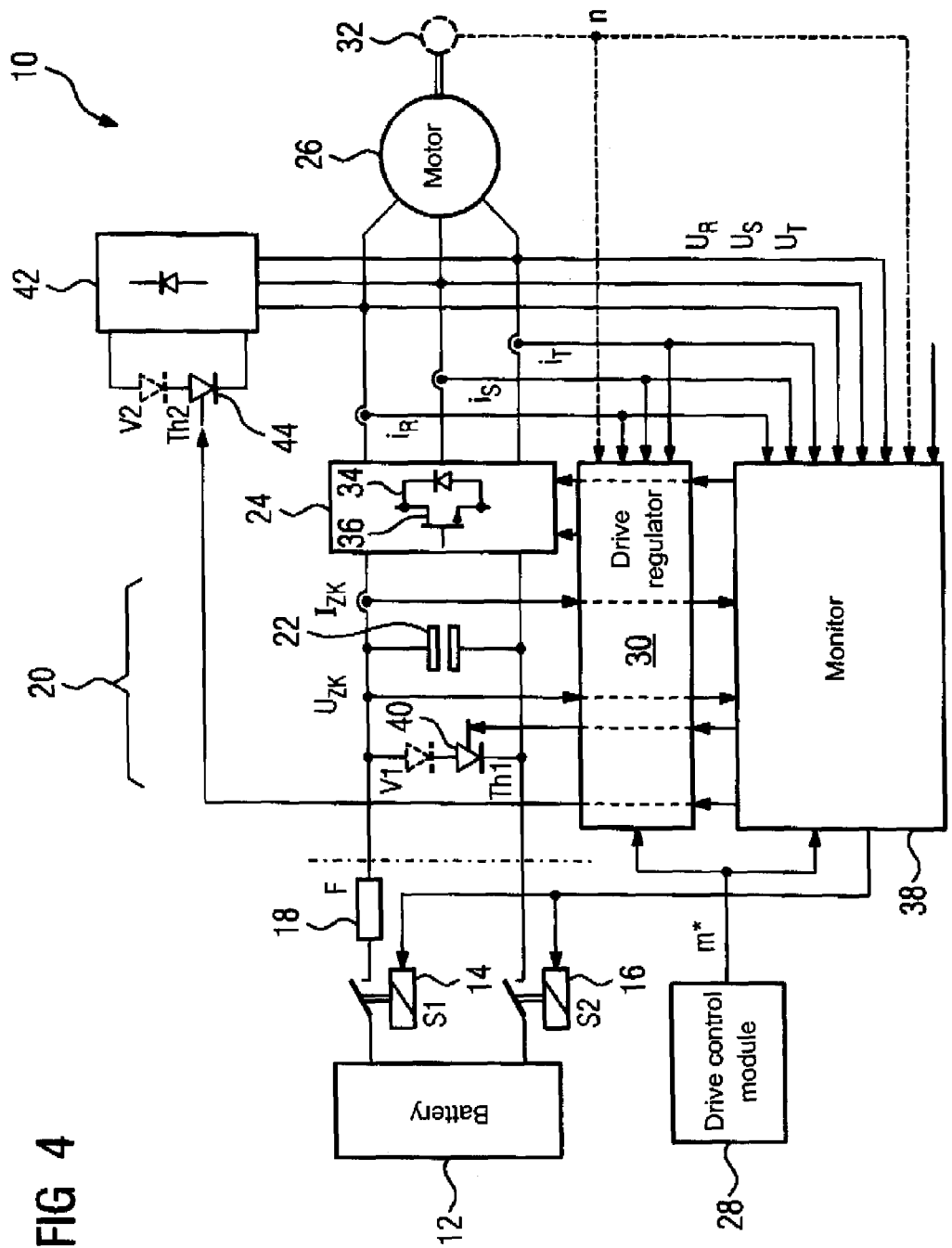
FIG. 4 shows a drive system according to the present invention.

FIG. 4 shows a drive system 10 based on the drive system 10 already shown in FIG. 1, for which reference should be made to the descriptions there, having torque reduction and voltage limiting means, which are activated in each instance in the event of a malfunction.

From the system variables of the drive system 10, specifically the measurement values already described in conjunction with the description of the diagram in FIG. 1, as well as additional measurement values in respect of the respective voltages u_R, u_S, u_T between the three phases supplying the motor 26, a measurement value for a current speed n and/or a motor position and any measurement values for a current torque, it is possible for the monitor 38 to monitor the condition of the drive system 10, in particular the respective torque.

Depending on the malfunction or condition of the system 10 corresponding actions are triggered by the monitor 38 as the control facility. The actuators provided for this purpose are primarily the inverter 24 contained in the system 10 anyway (see FIG. 1) and then as additional components of the system 10 a first electronic switch, in particular a thyristor—first thyristor 40—as well as a rectifier 42 and a second electronic switch, in particular a thyristor—second thyristor 44.

The first thyristor 40 is required to prevent unwanted recovery into the battery 12. The rectifier 42 and the second thyristor 44 are required to manage an overvoltage at the output of the inverter 24. A drive system 10, which includes both the first thyristor 40 and also the rectifier 42 and the second thyristor 44, can control both exceptional situations. However in principle a drive system 10 is also possible, in which control of one of the two exceptional situations mentioned above is sufficient or a priority. To this extent the first thyristor 40 on the one hand and also the rectifier 42 and the second thyristor 44 on the other hand as well as a corresponding interpretation of the monitor 38 for their activation should be seen as optional, alternative components of the drive system 10. The description continues in the following for a drive system 10, which includes both the first thyristor 40 and also the rectifier 42 and the second thyristor 44. The first and second thyristors 40, 44 can in principle also be replaced by a transistor. To distinguish this from the transistors 36 of the inverter 24, the description continues on the basis of thyristors 40, 44 as a respective switching element, with the term "thyristor" referring to a "thyristor or transistor" in each instance.

With certain errors or exceptional situations the first thyristor 40 is activated (ignited) by the monitor 38 when an overvoltage is detected in the intermediate circuit 20 or at the input of the inverter 24, if such an intermediate circuit voltage U_ZK or a measure of the intermediate circuit voltage that can be processed by the monitor 38 exceeds a predetermined or predeterminable threshold value. Due to the activation of the first thyristor 40 an armature short circuit results in the intermediate circuit 20 across the freewheeling diodes 34 of the inverter 24. In one embodiment of the drive system 10 the fuse 18 shown in FIG. 1 and FIG. 4 can be switched into the supply line from the battery 12. With such a fuse 18 it is possible to isolate the inverter 24 electrically from the battery 12 by tripping the fuse, due to the short circuit current flowing from the battery 12 when the first thyristor 40 is activated. This for example prevents the destruction of the first thyristor 40 by the short circuit current from the battery 12.

If the inverter 24 is still functional in the respective exceptional situation, the monitor 38 can also activate its three lower or its three upper transistors 36 or all the transistors 36. On activation of either the lower or upper transistors 36 just one additional electrical path results for the armature short circuit. Upon activation of all the transistors 36, two additional, redundant electrical paths result for the armature short circuit.

Figure 5:
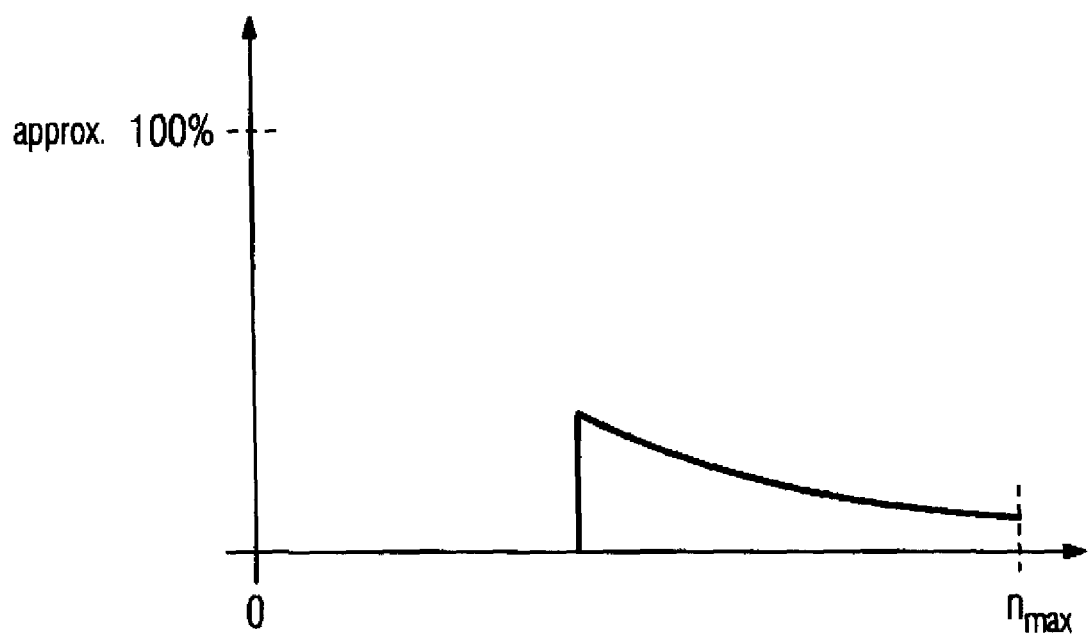
FIG. 5 shows a torque pattern that can be achieved with the drive system according to FIG. 4.

It is advantageous here that with the armature short circuit across the inverter 24 the first thyristor 40 is extinguished again (in other words deactivated) (holding voltage is higher than forward voltage of transistors 36; in some instances an additional diode VI shown in the diagram in FIG. 4 is required in series with the first thyristor 40). The armature short circuit is then maintained across the transistors 36 of the inverter 24. As soon as the speed of the motor 26 drops below a predetermined or predeterminable speed, in other words as soon as the speed or a measure of such a speed drops below a predetermined or predeterminable threshold value, the monitor 38 can deactivate the transistors 36 again. This terminates the armature short circuit and the otherwise high braking torque in the lower speed range can be reduced to zero, as shown in the diagram in FIG. 5 in an identical coordination system to the ones in the diagrams in FIG. 2 and FIG. 3.

The second thyristor 44 is also activated (ignited) by the monitor 38 in the event of certain errors or exceptional situations when an overvoltage is detected at one of the outputs of the inverter 24, if such an output voltage or a measure of the inverter output voltage that can be processed by the monitor 38 exceeds a predetermined or predeterminable threshold value.

Activation of the second thyristor 44 produces an armature short circuit across the transistors of the rectifier 42, which is embodied as a six-pulse rectifier based on the three-phase connector. The rectifier 42 is connected on the output side of the inverter 24 to motor terminals provided there. In the case of a motor 26 connected to the drive system 10 therefore the motor 26 and rectifier 42 are connected in parallel manner to the output of the inverter 24. The second thyristor 44 is connected on an output side, in other words the direct current side, of the rectifier 42 to its output terminals. The ignition of the second thyristor 44 brought about or to be brought about by the monitor 38 in the respective exceptional situation brings about the armature short circuit and at the same time a short circuit of the voltage between inverter 24 and motor 26.

This reliably avoids both a dangerously high voltage and also a dangerously high torque at high speed. The method illustrated below, in which the transistors are also switched, only serves to improve the response. Safety is ensured even if the transistors can no longer be switched. This also means that faults in the relatively complicated control logic for the transistors do not cause safety to be put at risk.

On or shortly before activation of the second thyristor 44, an attempt should be made to deactivate the still switchable transistors 36 of the inverter 24, to prevent an unnecessary current flow. In an embodiment of the transistors 36 with activation drivers with monitoring of the respective collector-emitter voltage (U_CE), automatic deactivation of the current-carrying, still switchable transistors 36 takes place as soon as the thyristor conducts.

When the lower or upper transistors 36 can be activated again, the thyristor can be extinguished again by activating the lower or upper transistors. The monitor 38 can then terminate the armature short circuit again, as soon as the speed of the motor 26 drops below a predetermined or determinable speed, in other words as soon as the speed or a measure of such a speed drops below a predetermined or predeterminable threshold value. In this manner the otherwise high braking torque is reduced to zero in the lower speed range (FIG. 5), as described above for the input side fuse. Before deactivation of the transistors 36, in other words before termination of the armature short circuit, the inverter 24 is preferably isolated electrically from the battery 12. In one embodiment the switches 14, 16 are able to do this as electrically or electronically activatable switches, for example as relays. The activation of a switch 14, 16 or both switches 14, 16 is performed indirectly or directly by the monitor 38, in response to the respectively established exceptional situation, in other words for example in response to an overvoltage on the output side of the inverter 24. Because the switch or each switch 14, 16 does not have to be opened when subject to current loading, no particular wear results.

The reliability of the drive system 10 can be further increased, if so-called dormant errors are also revealed by so-called forced dynamization, in other words intentional triggering of individual power components. One possibility here is for the first thyristor 40 to be checked by always opening the two switches 14, 16 after stopping the electric vehicle, in other words isolating the inverter 24 electrically from the battery 12, and then activating the first thyristor 40. The intermediate circuit capacitance 22 is then discharged across the first thyristor 40 and the expected current flow in the intermediate circuit 20 is the discharge current of the intermediate circuit capacitance 22. If the actual intermediate circuit current I_ZK is more than a predetermined or predeterminable threshold value above or below the expected discharge current, a malfunction is identified in respect of the functionality of the first thyristor 40. This check can be performed by the monitor 38. To this end values are stored in the monitor 38 for an expected discharge current and an associated threshold value, which is used to determine which value of the actual intermediate circuit current I_ZK is still considered to correspond to the expected value.

One possible way of testing the rectifier 42 and the second thyristor 44 is for the inverter 24 to output short voltage pulses one after the other in all six switching combinations while being monitored by the monitor 38 with the vehicle stationary and for the second thyristor 44 to be ignited at the same time. Because the monitor 38 checks by evaluating corresponding measurement values whether a current i_R, i_S, i_T is flowing, all six diodes in the rectifier 42 and the second thyristor 44 can be tested. The voltage pulses here have to be so short that the resulting current is not too high. In some instances a diode V2 shown in the diagram in FIG. 4—possibly a series circuit of the diode V2 and a small throttle—is provided in series with the second thyristor 44 to limit the current increase. Alternatively the voltage pulses can be transferred to the motor before ignition of the thyristor in each instance. The thyristor is only ignited after the transistors have been blocked at the end of the respective voltage pulse. The decay time of the current is much longer with a successfully ignited thyristor than with a non-conducting thyristor or defective diodes. All the diodes of the rectifier and the thyristor can be tested thus.

Individual prominent aspects of the description herewith submitted can be summarized briefly as follows: to reduce braking torque and/or for overvoltage protection in the event of a malfunction a first thyristor 40 in the intermediate circuit 20 and/or a second thyristor 44 and a rectifier 42 on the output side of the inverter 24 is/are used in addition to the inverter 24. These additional actuators 40, 42, 44 and the inverter 24 are activated by way of an in particular safety-oriented torque monitor (monitor 38). The choice of which actuator 24, 40, 42, 44 or which switching elements 36 contained therein are activated is derived from system variables such as current (IZK, i_R, i_S, i_T), voltage (U_ZK, u_R, u_S, u_T) and/or position or speed (m) of the motor 26, etc. Generally the drive system 10 proposed here permits a multiply redundant armature short circuit. Also in the embodiment with at least the first thyristor 40 the inverter 24 can be isolated electrically from the battery 12 at least on the input side and in the embodiment with the first thyristor 40 on the one hand and the rectifier 42 and the second thyristor 44 on the other hand it can be isolated electrically on both sides from the energy suppliers (battery 12, motor 26) in a contactless manner. Also by activating all the transistors 36 of the inverter 24 the respectively activated thyristor 40, 44 can simply be extinguished again, Finally to switch on the battery voltage, switches 14, 16 that are normally required anyway can be included in the safety concept and the safety-related power components 40, 42, 44 can be checked for functional capacity by means of specific switching positions and activation methods brought about by the monitor 38.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A drive system for an electric motor, comprising:
   a connection for a battery,
   an inverter having an input side connected to an intermediate circuit having a DC intermediate circuit voltage and an output side having a connection for the electric motor, said intermediate circuit comprising an intermediate circuit capacitance and a first thyristor connected directly in parallel with the intermediate circuit capacitance and configured to be activated by a monitor incorporated in or assigned to the drive system when a measure of the intermediate circuit voltage exceeds a predetermined threshold value so as to cause an armature short circuit of the electric motor,
   a rectifier having an input side connected at the output side of the inverter in parallel with the electric motor and the rectifier further having an output side providing a rectified DC output voltage which is a measure of the AC output voltage of the inverter, and
   a second thyristor connected to the output side of the rectifier and configured to be activated by a monitor incorporated in or assigned to the drive system when the rectified DC output voltage exceeds a predetermined threshold value.

2. The drive system of claim 1, further comprising a fuse disposed between the battery and the intermediate circuit, wherein the fuse and the first thyristor are connected in series to the battery operating as power source upon activation of the first thyristor.

3. The drive system of claim 1, wherein the second thyristor is activated by the monitor when a measure of the AC output voltage of the inverter exceeds a predetermined threshold value.

4. The drive system of claim 1, wherein the inverter comprises three upper transistors and three lower transistors, and wherein the monitor activates either the three lower transistors or the three upper transistors, or jointly the three lower and the three upper transistors, in addition to activating the first thyristor.

5. The drive system of claim 1, wherein the inverter comprises three upper transistors and three lower transistors, and wherein the monitor activates either the three lower transistors or the three upper transistors, or jointly the three lower and the three upper transistors, in addition to activating the second thyristor.

6. The drive system of claim 4, wherein the monitor terminates activation of the three upper and/or the three lower transistors when a measure of a speed of the electric motor drops below a predetermined threshold value.

7. The drive system of claim 5, wherein the monitor terminates activation of the three upper and/or the three lower transistors when a measure of a speed of the electric motor drops below a predetermined threshold value.

8. The drive system of claim 4, further comprising at least one electrical or electronic switch disposed between the battery and the intermediate circuit, wherein at least one electrical or electronic switch is opened before termination of the activation of the three upper and/or the three lower transistors by the monitor.

9. The drive system of claim 5, further comprising at least one electrical or electronic switch disposed between the battery and the intermediate circuit, wherein at least one electrical or electronic switch is opened before termination of the activation of the three upper and/or the three lower transistors by the monitor.

10. The drive system of claim 1, wherein the monitor activates the second thyristor and activates the inverter to cause the inverter to output successive short voltage pulses, and monitors, during or after each voltage pulse, whether the respective voltage pulse produces a current flow.

* * * * *